United States Patent [19]

Ahuja

[11] 4,368,363
[45] Jan. 11, 1983

[54] AUDIBLE LINE TEST TERMINATION DEVICE

[75] Inventor: Omprakash G. Ahuja, East Meadow, N.Y.

[73] Assignee: TII Industries Inc., Copiague, N.Y.

[21] Appl. No.: 262,450

[22] Filed: May 11, 1981
(Under 37 CFR 1.47)

[51] Int. Cl.³ .................... H04M 1/26; G01R 19/14; H04B 3/46
[52] U.S. Cl. ................ 179/175.3 R; 179/84 L
[58] Field of Search ......... 179/175, 175.1 R, 175.3 R, 179/84 L, 175.2 B, 175.24, 175.25, 81 C; 324/51, 52, 53

[56] References Cited

U.S. PATENT DOCUMENTS

| | | | |
|---|---|---|---|
| 3,600,678 | 8/1971 | Garrett et al. | 179/175 |
| 3,896,270 | 7/1975 | Kopec et al. | 179/84 L |
| 3,941,950 | 3/1976 | Dunwoodie et al. | 179/175.3 R |
| 3,951,248 | 4/1976 | Feiner et al. | 179/175 |
| 3,976,849 | 8/1976 | Champan | 179/175.3 R |
| 3,983,338 | 9/1976 | Mathauser | 179/175 |
| 4,209,671 | 6/1980 | Charles et al. | 179/175 |
| 4,264,894 | 4/1981 | Ellington | 179/275.3 R |
| 4,288,660 | 9/1981 | Fasano | 179/175 |

Primary Examiner—Thomas A. Robinson
Attorney, Agent, or Firm—Martin Sachs

[57] ABSTRACT

An audible test termination device for providing a characteristic signature to the telephone central office and an audible signal to the customer when a continuity test is made on a subscriber line having a pair of electrically conductive paths includes a miniature audio indicator and a minimum of associated electrical components to indicate to the central office test operator and the customer that the telephone subscriber line is in operating order. One embodiment of the instant invention may be utilized as an additional high impedance ringer for the customer. The present device may be permanently installed across the subscriber line.

7 Claims, 8 Drawing Figures

AUDIBLE LINE TEST TERMINATION DEVICE

BACKGROUND OF THE INVENTION

1. Field of the Invention

The present invention relates to telephone line test termination devices and, in particular, to a circuit arrangement which provides a unique or characteristic signature to the central office when a continuity test is being made on a subscriber line and provides an audible signal to the customer during this test.

2. Discussion of the Relevant Art

Many different types of circuit arrangements have been suggested for use in testing telephone subscriber lines from a remote location. Generally, these circuit arrangements require installation at the subscriber's location or must be utilized by a telephone installer who must physically visit the premises where the telephone is installed and then signal the central office so that the central office test operator may perform the required test to determine if the subscriber lines are in working order. Many of these circuit arrangements include a switching device and a tuned circuit which is activated from the central office. These components are unreliable and require an installer to enter the home where the telephone is located. This is unsatisfactory for numerous reasons. Generally, the devices are unable to remain permanently at the installed telephone, or if they are capable of being installed permanently, they require activation by an AC signal provided by the central office. None of the devices heretofore are capable of providing an audible signal at the premises where the telephone is installed during the testing of the subscriber lines by the central office test operator. Requiring a telephone installer to enter the customer's premises or requiring activation of the equipment by a superimposed signal from the central office is an unreliable method and therefore is unsatisfactory.

A simple reliable means of providing a characteristic signature or impedance across the subscriber's conducting path, which can provide an audible signal to the customer when the test is performed and can provide an indication at the central office that the subscriber line is intact and operable by merely utilizing a DC test voltage and a reversing switch, is an ideal solution to the problem.

SUMMARY OF THE INVENTION

The present invention overcomes the shortcomings of the prior art by providing a simple, inexpensive circuit arrangement that is capable of providing an audible indication at the customer's telephone termination, which may be installed permanently at the customer's telephone or station protector, be installed by the use of a removable plug, or may be provided with the installation of new telephone equipment by providing the instant circuit arrangement in the instrument and/or its associated plug.

Therefore, it is an object of the present invention to provide a simple, inexpensive circuit arrangement that may be connected across a subscriber line to yield a characteristic signature or impedance which may be readily recognized by a central office interrogating the line during a continuity test and provide an audible signal at the subscriber's (customer's) telephone or station protector.

Another object of the present invention is to provide a subscriber termination device which has a characteristic signature and provides an audible indication that may be left across the subscriber line at all times.

It is yet another object of the present invention to provide a reliable termination device for telephone subscriber lines that will yield a characteristic signature, provide an audible indication when the line is being interrogated by the central office and provide a device that is capable of being utilized as an auxiliary ringer with or without a telephone instrument associated therewith.

A line test termination device for providing a characteristic signature to the telephone central office when a continuity test is being made on the subscriber line having a pair of electrically conductive paths, according to the principles of the present invention, includes a series current path with a resistance, a diode, a voltage breakover device, and an audio indicator connected in series. The diode is poled opposite to the voltage breakover device and the current path is connected across conductive paths of the subscriber line. All of the components are housed in a wall mounted connecting device which mates with a connecting device provided on a telephone instrument, or they are mounted within a housing having a connecting device on one end which mates with the wall mounted connecting device and has a connecting device on the opposite end that mates with the connecting device provided on a telephone instrument.

The foregoing and other objects and advantages will appear from the description to follow. In the description, reference is made to the accompanying drawing which forms a part hereof, and in which is shown by way of illustration, a number of specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
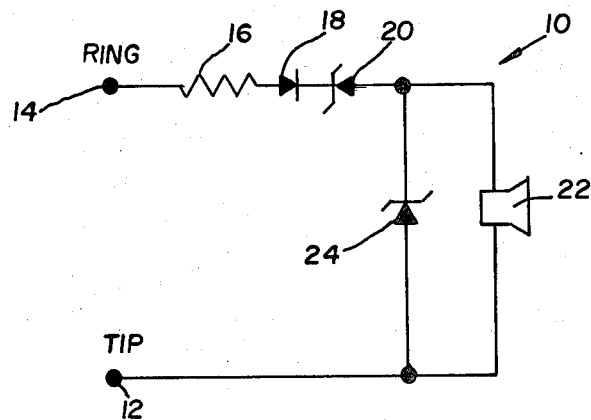
FIG. 1 is a schematic circuit diagram of one embodiment of a line test termination device, according to the principles of the present invention.
Figure 3:
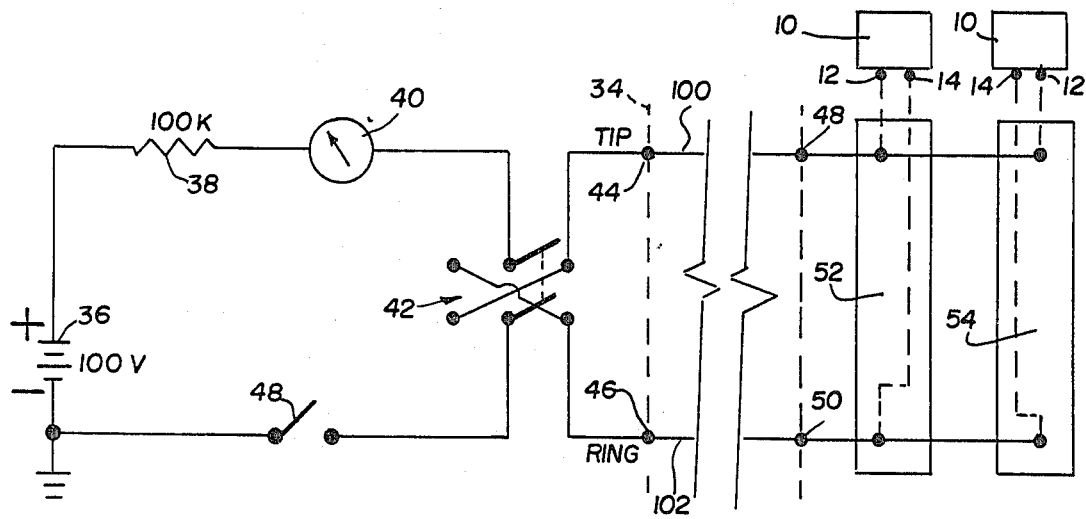
FIG. 3 is a schematic circuit and functional block diagram of the continuity test performed by the central telephone office on a subscriber line.

Referring now to the figures, and in particular, to FIG. 1, there is shown one embodiment 10 of an audible line test termination circuit arrangement, which may be connected across a subscriber line having a pair of electrically conductive paths 100 and 102, as shown in FIG. 3. The tip terminal 12, shown in FIG. 1, is connected to one of the conductive paths 100 while the ring terminal 14 is connected to the other conductive path 102 of the subscriber line providing a series current path therebetween that includes a resistor 16 connected in series with a diode 18, a breakover device 20, which preferably is a zener diode, and audio indicator 22. A typical audio indicator suitable for this application is Model No. A1-250 manufactured by Projects Unlimited, Inc., of Dayton, Ohio 45414.

In the circuit arrangement shown in FIG. 1, the resistor has one end thereof connected to ring terminal 14 and the other end thereof connected to the anode of diode 18 which, preferably, is of the semiconductor type. The cathode of diode 18 is connected to the cathode of zener diode 20. The anode of zener diode 20 is connected to one end of the audio indicator 22 and the other end of audio indicator 22 is connected to the tip terminal 12. A second breakover device, preferably a zener diode 24, is connected across or in parallel with the audio indicator 22 to limit the voltage appearing thereacross to a safe operating level. The circuit arrangement as shown in FIG. 1 may be connected across a conventional voltage arrester, not shown, or installed across any other device placed across the subscriber line as shown in FIG. 3.

For a more detailed discussion as to the housings that may be utilized for the audible line test termination circuit arrangement, reference may be made to FIGS. 6, 7 and 8 which will be discussed hereinafter.

Since resistor 16, diode 18, zener diode 20 and audio indicator 22 are connected in a series path, their respective position in the current path is not critical as long as the diodes 18 and 20 are poled as shown and protective zener diode 24 is poled in the same direction as zener diode 20 as indicated in FIG. 1.

Figure 5:
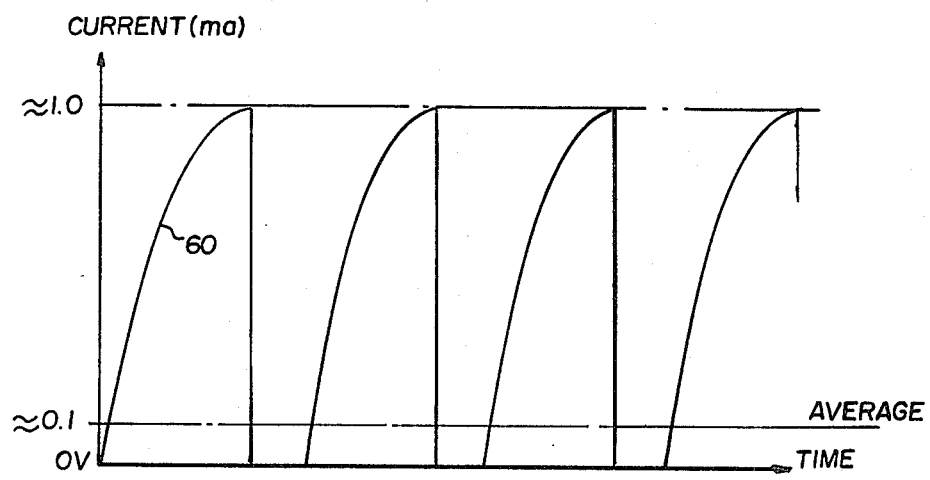
FIG. 5 is a pictorial representation of voltage versus time showing continuous variations in current on a subscriber line having the instant invention affixed thereacross, when it is interrogated by the central office.

In operation, a DC voltage is applied across terminals 12 and 14 by the central office test operator when he interrogates the subscriber line to determine its continuity. The operation of this test and interrogation circuitry will be explained in conjunction with FIG. 3. However, it is to be noted that a positive voltage appearing on terminal 12 with respect to terminal 14 will not permit any current to flow therebetween (excluding leakage currents) because diode 18 is reverse biased. When terminal 14 is made positive with respect to terminal 12, the current will be permitted to flow through diode 18 and, if the voltage being applied is sufficiently high, will cause zener diode 20 to breakover and permit current to flow into the audible indicator 22 causing an audible tone to be heard. The current being drawn by the audible indicator 22 is shown in FIG. 5.

A DC current meter 40 inserted at the central office test station will not vary in accordance with the current shown, since it is unable to respond to the rapid changes which occur at frequencies of approximately 4,000 Hz. A DC current change with reversed polarity of the test voltage will indicate to the test operator that the subscriber's line (electrically conductive paths 100 and 102) are intact and suitable for use.

Figure 2:
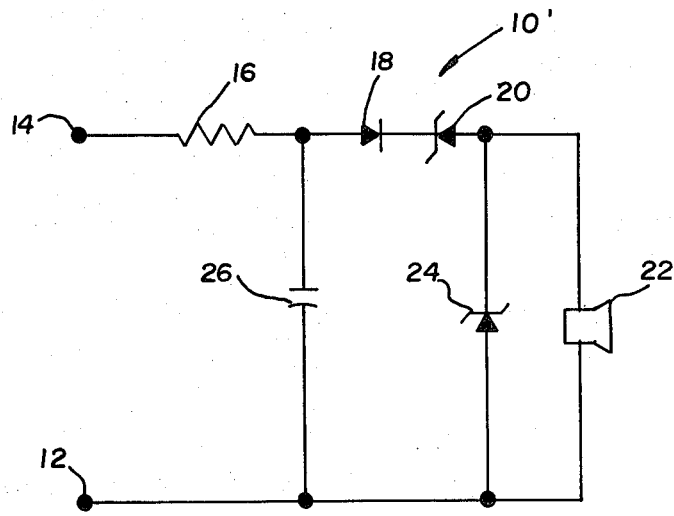
FIG. 2 is a schematic circuit diagram of another embodiment of the instant invention.

The main difference between the embodiments (circuit arrangements) disclosed is that the embodiment disclosed in FIG. 2 is not responsive to and will not produce an audible indication when ringing voltage is applied across terminals 12 and 14 or if the DC test voltage is less than 100 volts. The embodiment (circuit arrangement) disclosed in FIG. 1 is responsive to AC ringing voltage and when left across the subscriber line, may be utilized as a high impedance auxiliary ringer and produces an audible tone when the ringing voltage is applied to the line whether a telephone instrument is physically across the line or not. Either circuit arrangement may be used in conjunction with a varying impedance line test termination device or a fixed impedance line test termination device as disclosed in Patent Applications Ser. No. 224,680 by G. F. McDonald, filed on Jan. 13, 1981 and Ser. No. 224,914 by O. G. Ahuja, filed on Jan. 15, 1981.

FIG. 3 discloses a test circuit arrangement utilized by the telephone central office to interrogate a subscriber line in order to determine if the line is in operating order and is not broken or open somewhere between the central office and the subscriber's home. All the items shown to the left of broken line 34 are generally located at the telephone central office at the test station and include a DC voltage source 36 (approximately 100 volts) which has a series current limiting resistor 38 of approximately 100,000 ohms connected in series with a DC milliammeter 40 and a polarity reversing voltage switch 42 connected to terminals 44 and 46, and a switch 48 which is also included to complete the test circuit path. The subscriber telephone lines 100 and 102 are connected to terminals 44 and 46, respectively, at the central office and are connected to terminals 48 and 50, respectively, at the subscriber's end where the telephone instruments 52 and 54 are to be installed. Any number of telephone instruments may be connected in parallel, in a conventional manner. Each of the telephone instrument terminations may include an audible line test termination device 10 or 10' connected across the instrument conductive wires as shown herein, thereby providing the characteristic signature of a low impedance in one direction and a high impedance in the other direction (reversal of polarity). The audible line test termination device 10 may be incorporated in a housing which may be readily installed into a receptacle presently in use by the telephone company. The housing may also provide a means for accepting a telephone hand-set plug so that it may be left in position permanently.

With the present utilization of telephone plugs and jacks by the telephone companies, the instant invention is ideally suited for use therewith, since the telephone subscriber is permitted to install his own telephone instrument, and the telephone line must be checked or tested by the central office in order to determine its suitability for use. These tests, which are made by the central office test operator, determine if the subscriber line is open, shorted, grounded or has a foreign battery on it. Without a telephone set and its associated ringer connected to the line, the test for continuity (open circuit) cannot be reliably made unless telephone personnel are dispatched to the customer's location to assist in performing the test.

With the instant invention, this shortcoming is overcome. The central office may now check the subscriber line where an audible line test termination device has been installed and with the cooperation of the customer, the test is further verified by providing an audible signal. The central office test desk makes the loop continuity test by accessing the subscriber line in the conventional manner and operates the ground key (switch 48) on the test board. Switch 48 applies +100 volts DC in series with a 100k ohm resistor 38 through the tip side of the subscriber's line and provides a ground to the ring side of the line. By operating the reverse key or switch 42, these connections are changed so that the positive voltage is applied to the ring side of the subscriber line and the ground is applied to the tip side of the subscriber line.

A good subscriber line without an audible station termination device 10 or 10' connected to it will cause a test board meter 40 to read zero (except that a brief meter "kick" will be observed while the ringing capacitor charges if it is connected to the line during this test). Operating the reverse key (switch 42) while keeping the ground key (switch 48) closed will also produce the same effect. If no ringer is connected, it cannot be determined from the 0 meter reading if the line has continuity to the station protector or to the telephone jack at the subscriber location. If a short circuit exists anywhere along the tip or ring conductors of the line, the meter reading would be somewhere between 0 and 100 and would not change when the reverse switch 42 is operated.

Figure 4:
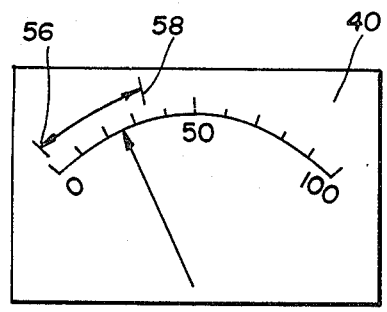
FIG. 4 is a pictorial representation of a meter face at the central office when interrogation of a subscriber line is made.

If an audible line test termination device as disclosed hereinabove is installed at the subscriber location, the telephone office test desk meter 40 shown enlarged in FIG. 4, will indicate zero on a good or open line when the positive voltage is applied to the tip side of the line (terminal 44) as when switch 42 is in the right-hand position shown in FIG. 3. By moving switch 42 to the left-hand position as shown in FIG. 3, the positive voltage from the DC test source 36 will be applied to the ring side of the line (terminal 46) and the meter will assume some value between zero and 100 (58), depending on the distance the termination is located from the central office test station. The current through the audio indicator 22 will vary at a rate somewhere between 3K and 5K Hz depending upon the actual voltage available thereacross. The rapid change of current through the audio indicator will not be apparent at the meter 40 because the percentage variation in current compared to the total current being fed to the lines is small and the meter 40 is not capable of responding to variations occurring in this frequency range and, therefore, will assume an average value and remain thereat. The current variations through the audio indicator 22 is shown at 60 in FIG. 5.

If an AC ringing voltage of approximately 100 volts rms is superimposed upon the normal voltage appearing on a subscriber line of 48 volts, the voltage appearing across diode 18 would be rectified providing a DC voltage in excess of the zener breakover voltage of zener diode 20, thereby providing a DC current to the audio indicator 22 and causing it to emit an audible sound somewhere between 3K and 5K Hz which would be heard by the customer providing an auxiliary ringing device. If the embodiment 10' (FIG. 2) is utilized the test operator sees the same indications on meter 40 and always sees the capacitor kick, since capacitor 26 is across the line. However, with this embodiment, (FIG. 2) superimposing an AC voltage upon the normal DC (48 volts) appearing on the subscriber line will not provide a sufficiently high DC voltage, when rectified by diode 18 to breakover zener diode 20, because capacitor 26 is a relatively low impedance to the AC ringing voltage. Thus, audio indicator 22 would not operate and would not provide an audio output signal for the customer. Therefore, the only time an audio output is obtainable from the embodiment disclosed in FIG. 2 is when the subscriber line is undergoing a test by the test operator at the central office.

Figure 6:
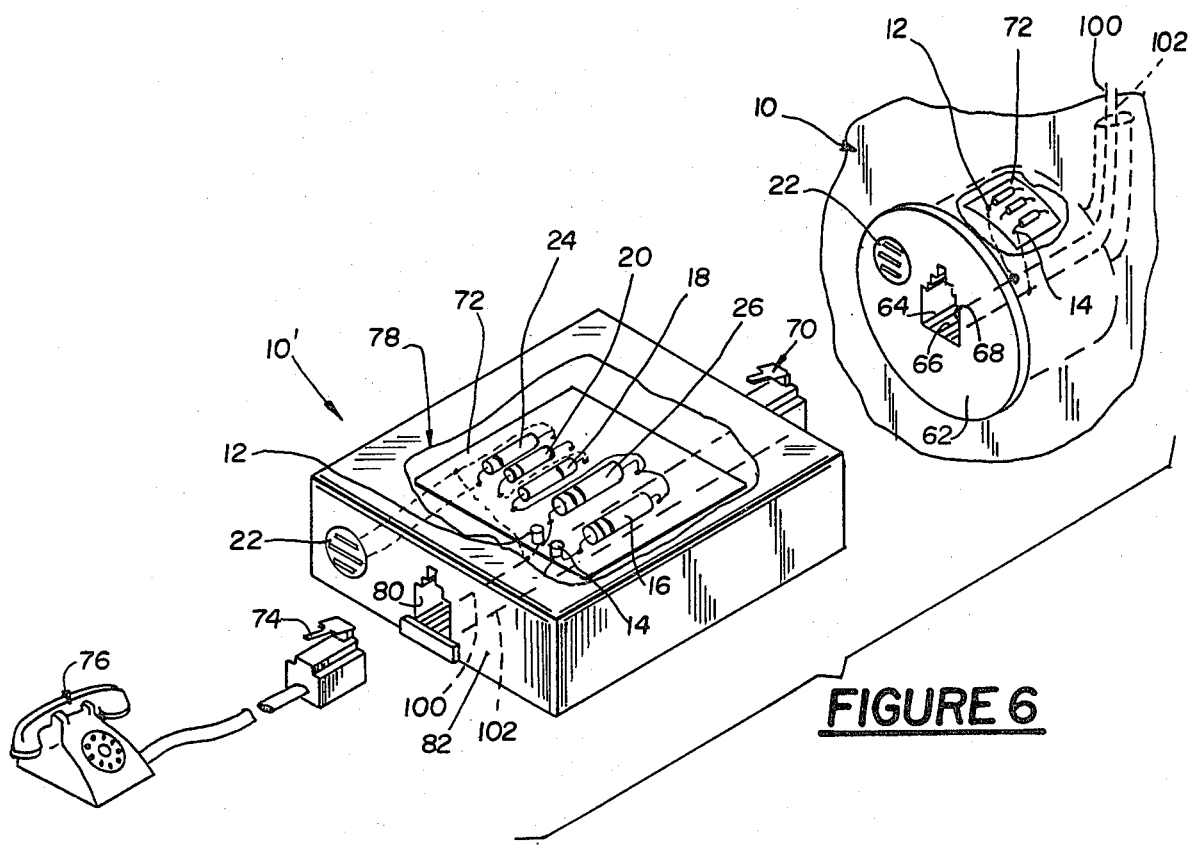
FIG. 6 is a pictorial representation, not to scale, of three alternative housings which may be utilized in the instant invention.

FIG. 6, shown with enlarged portions, discloses a plurality of housings for the audible line test termination devices 10 and 10' which is capable of providing the characteristic signature to the telephone central office, not shown, when a continuity test is made on a subscriber's telephone line generally consisting of a pair of electrically conductive wires 100 and 102, which are connected to the telephone central office. The wires 100 and 102 are terminated by the telephone company in a wall socket 62 which provides electrically conductive contacts 64 and 66 onto which wires 100 and 102 are affixed, in a conventional manner. The wall socket 62 is provided with an aperture 68 having an irregular shape which is adapted to mate with a male plug 70 that is provided with electrically conductive contacts, not shown, that cooperate with contacts 64 and 66 of receptacle 62, thereby continuing the electrically conducting path therethrough. The wires (electrically conductive paths) 100 and 102 have connected thereacross a series current path including a resistor 16, having a value of between 10K and 100K ohms, a diode 18, a zener diode 20 and an audio indicator 22. A zener diode 24 is preferably connected across audio indicator 22. Preferably, zener diode 20 has a breakover voltage of approximately 75 volts and zener diode 24 has a breakover voltage of approximately 15 volts. The above mentioned components 16, 18, 20 and 24, are connected across terminals 12 and 14 and are preferably mounted on a miniature printed circuit terminal board 72 that has thereon terminals 12 and 14. Terminals 12 and 14 are connected across the conductive wires 100 and 102 and may be affixed there permanently. The circuit arrangement will thus, provide a characteristic signature when a telephone line cord plug 74, that is normally provided on a telephone set 76, is inserted into aperture 68 or omitted therefrom.

In an alternative embodiment, the line cord plug 74 appearing on instrument 76 may be provided in housing 78, which includes a plug 70 provided at one end and is provided with a receptacle or socket 80 adapted to receive telephone line plug 74 therein to continue the electrical conductive paths formed by wires 100 and 102 which are continued through plug 70 to the contact area of receptacle 80. The circuit arrangement, such as for example, disclosed in FIG. 2, may be included on a printed circuit board 72 and connected across conductive paths 100 and 102 in the same manner as that disclosed for socket 62. The audio indicator 22 may be mounted in the end surface 72 of housing 78 so that an audible indication may be readily radiated into the room where the interrogation of the subscriber line up to and including, the housing 78 is made by the telephone central office. Thus, the circuit arrangement may be installed in a separate housing 78 or in a wall socket 72. Moreover, it may be even more convenient for the telephone company to install the preferred circuit arrangement in the telephone set 76 with the audio indicator 22 either provided in the telephone itself or in its associated line cord plug 74.

Figure 7:
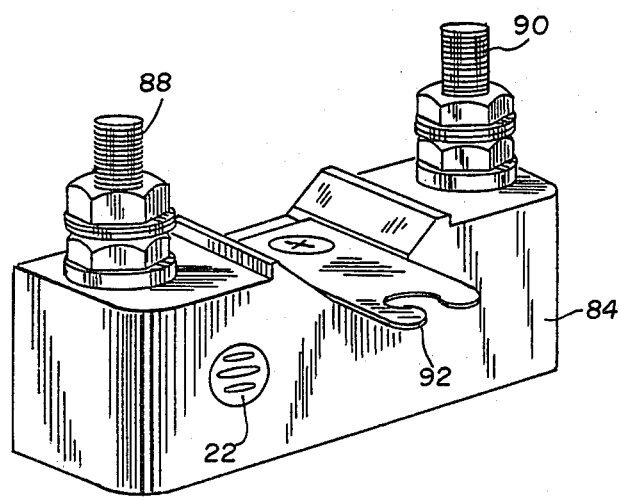
FIGS. 7 and 8 are further alternative housings for the instant invention.

Yet another embodiment of a housing suitable for any of the circuit arrangements disclosed hereinbefore is shown in FIG. 7. Housing 84 may include a two or three-electrode gas tube arrester, a fail-short device, and a back-up air gap device, not shown, known as TII-355 and TII-356 manufactured by TII Industries, Inc. of Copiague, N.Y.

Figure 8:
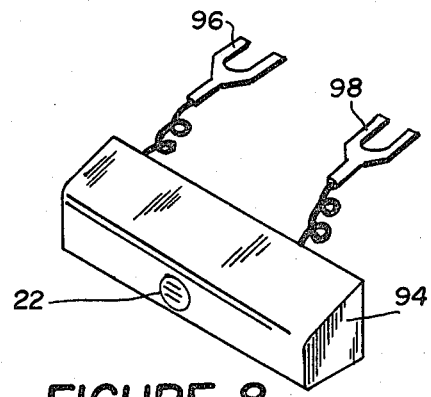

The housings may include any one of the circuit arrangements described hereinbefore and preferably include the additional audio indicator device 22 mounted in the housing as shown in FIGS. 7 and 8. The housing shown in FIG. 7 includes a terminal 88 and 90 and a ground lug 92. Terminals 88 and 90 are readily wired across the subscriber telephone lines 100 and 102 at some point where the subscriber line comes into the residence. It is suitable for both indoor and outdoor installations and may be provided in a housing, not shown, wherein a plurality of housings 84 may be conveniently installed. Of course, ground lug 92 is connected to earth ground, in a conventional manner, to provide a path for any over voltage or lightning strike.

The embodiment disclosed in FIG. 8 includes a housing 94 which has extending therefrom a pair of spade lugs 96 and 98 which may be wired across the subscriber line 100 and 102 at any convenient point. An audible indication of interrogation by the central office is provided by the audio indicator 29 mounted on the top surface of housing 94.

Hereinbefore has been disclosed an audible line test termination device and circuit arrangement therefor which is inexpensive to manufacture and is readily incorporated into presently existing telephone line cords, plugs and jacks. It will be under, stood that various changes in the details, materials, arrangements of parts and operating conditions which have been herein described and illustrated in order to explain the results of the invention may be made by those skilled in the art within the principles and scope of the present invention.

Having thus set forth the nature of the invention, what is claimed is:

1. A line test termination device for providing a characteristic signature to the telephone central office and an audible signal at the subscriber termination when a continuity test is made on a subscriber line having a pair of electrically conductive paths, comprising; a series current path including a resistance means, a diode means, voltage breakover means and an audio indicator means connected in series, said diode means being poled opposite said voltage breakover means, said current path being connected across said electrically conducting paths.

2. A line termination device according to claim 1 wherein said audio indicator means further includes a second voltage breakover means connected in parallel therewith to limit the voltage thereacross to its safe operating value when said telephone central office performs said continuity test on said subscriber line.

3. A line test termination device according to claim 1 wherein said voltage breakover means is a zener diode.

4. A line test termination device according to claim 1 further including a zener diode connected in parallel with said audio indicator means to limit the voltage thereacross, said zener diode being poled opposite to said diode means.

5. A line test termination device according to claims 1, 2, 3 or 4 wherein said resistance means has one end thereof connected to one of said electrically conductive paths and further including a capacitor, said capacitor being connected from the other end of said resistance means to said other of said electrically conductive paths.

6. A line test termination device according to claims 1, 2, 3 or 4 further including a housing, said housing including input and output connecting means for continuing said electrically conductive paths, said input connecting means being adapted to receive a mating connector means provided on a telephone instrument and continue said electrically conductive paths through said mating connector means, said output connecting means being adapted to be received by a wall receptacle having therein said electrically conductive paths extending to said telephone central office, said housing having said resistance means, said diode means, said voltage breakover means and said audio indicator means disposed therein.

7. A line test termination device according to claims 1, 2, 3 or 4 further including a housing, said housing including connecting means for continuing said electrically conductive paths from said telephone central office, said connecting means being adapted to receive a mating connector means provided on a telephone instrument and continue said electrically conductive paths through said mating connector means to said telephone instrument, said housing having said resistance means, said diode means, said voltage breakover means, and said audio indicator means disposed therein.

* * * * *